June 26, 1962 L. W. PARKER 3,041,539

MULTIBAND TELEVISION RECEIVERS

Filed Feb. 9, 1959

INVENTOR

Louis W. Parker

BY *[signature]*

ATTORNEYS 3,041,539
Patented June 26, 1962

3,041,539

MULTIBAND TELEVISION RECEIVERS

Louis W. Parker, Blair Road, Oyster Bay Cove, N.Y.

Filed Feb. 9, 1959, Ser. No. 791,964
11 Claims. (Cl. 325—315)

Figures 1, 2, 3, 4:
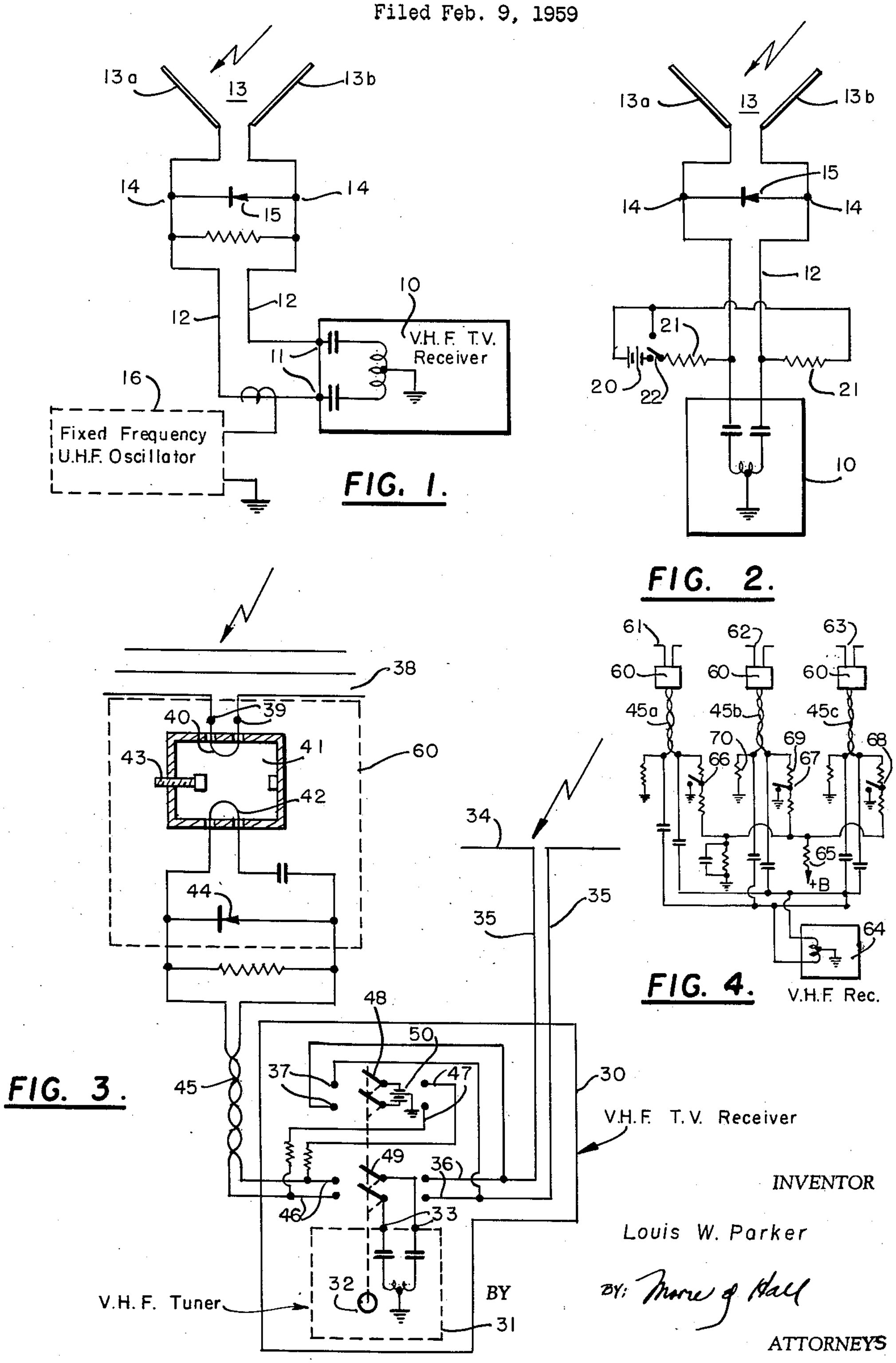

The present invention relates to improved antenna and receiver arrangements adapted to receive conventional very high frequency (hereinafter referred to as "VHF") television transmissions as well as a special type of ultra high or super high frequency (hereinafter referred to as "UHF") television transmissions, whereby a conventional VHF television receiver may respond to either type of transmission without modification of the receiver circuits per se.

In this respect, the present invention comprises a continuation-in-part of my prior copending application Serial No. 626,569, filed November 28, 1956, for: "Ultra High Frequency Systems" which prior application is in turn a continuation-in-part of my applications Serial No. 288,-238, filed May 16, 1952, for: "Ultra High Frequency Systems," and Serial No. 280,927, filed April 7, 1952, for: "Television Distributing System." In my prior copending applications identified above, I have described novel arrangements for broadcasting television or other wide band modulated waves on ultra high frequency bands. Insofar as the special types of UHF television transmissions described in said prior applications are necessary to a complete understanding of the instant application, the descriptions in said prior applications are incorporated herein by reference. In order that a general understanding of the special type of television transmission contemplated by these prior applications may be had in the instant specification without specific references to these prior applications, however, a general summary will now be given of the systems contemplated by said prior applications.

As described in my prior applications, a conventional VHF receiver can receive and respond to a special type of UHF transmission comprising two different ultra high frequency signals radiated from a transmitting location. In the transmission arrangement, a modulated UHF transmitter is provided which is adapted to broadcast to VHF receivers, with the aid of a UHF continuous wave (hereinafter referred to as C.W.) transmitter which differs in frequency from the modulated transmitter by a frequency within the tuning range of the VHF receiver. The receiver itself employs a converter at its antenna which responds to the received modulated and C.W.–UHF signals to produce a VHF beat frequency signal within the tuning range of the VHF receiver.

In the arrangement described, the C.W.–UHF signal preferably has ten to one hundred or even more times the power of the modulated UHF signal in order that a crystal rectifier, located at the receiver, may be impressed with at least a certain minimum input necessary for efficient operation of that rectifier; and in order to extend the range of the overall system, additional high power C.W. transmitters may be placed at other locations throughout the area in which the range is to be extended whereby such extension of range is effected without increasing the power of the modulated UHF transmitter. As is described in my prior applications, each such further UHF–C.W. transmitter is located near the limit of the effective range of the other UHF–C.W. transmitters employed in a given area; and various ones of said transmitters utilize directional transmitting antennas so as to cover a given area efficiently without appreciable interference of one transmission with another.

A specific example, illustrating the foregoing may be of assistance in fully appreciating the type of transmissions involved. Thus, in the arrangements described in my aforementioned prior applications, an ultra high frequency television transmitter of substantially conventional design may be provided, operating for example at a picture carrier frequency of say 5060 mc. The related sound signal may be broadcast as an upper side band. In addition, a continuous wave heterodyning signal is transmitted along with the first mentioned signal, from another transmitter operating at say 5000 mc. At the receiver, these two signals are mixed in a special mixer which may comprise, for example, a cavity resonator adapted to resonate at the two frequencies of the two different transmitters along two different dimensions of the resonator respectively; and the cavity resonator is further provided with a pickup loop acting as an output for the resonator and having a signal therein which is a combination of the signals from the two transmitters. The output of the pickup loop is rectified by a crystal rectifier. This results in the generation of a VHF beat frequency within the tuning range of a conventional VHF receiver. Such VHF beat frequency may then be fed to such a conventional VHF receiver for amplification in a normal manner.

The second transmitter mentioned above, i.e. the one operating for example on the 5000 mc. frequency, has much better frequency stability than the usual local oscillator and preferably a much higher power output than the modulated transmitter; and both the modulated and C.W.–UHF signals are transmitted together from a predetermined location within an area to be covered by said UHF transmissions. To extend the range of the system, it is not necessary to increase the power of the modulated transmitter; and all that is necessary is that additional high power continuous wave transmitters be placed at other locations throughout the area into which the range is to be extended. These additional C.W. transmitters should operate on or near the frequency of the first-named C.W. transmitter, i.e. at approximately 5000 mc. in the example given, but the frequency of these additional C.W. transmitters need not be exact; and the several C.W. transmitters need not be synchronized with one another. Beyond the range of the modulated video signal transmitted by the aforementioned video transmitter, additional video transmitters can be provided using another frequency, e.g. 4940 mc., whereby these further modulated video signals will still cooperate with the same frequency (5000 mc.) of continuous wave signal to generate the same VHF signal as the other modulated frequency of 5060 mc.

On the receiving end, it is usually impractical to amplify the incoming signal at ultra high frequencies. Therefore it is necessary that the crystal rectifier mentioned operate at some locations on very weak signals; and this consideration in fact applies to the arrangements to be described hereinafter. The minimum value of modulated signal voltage can be very low, since it need only be above the noise level, which may be in the order of 10 microvolts. Insofar as the continuous wave signal voltage is concerned, however, the minimum value of this C.W. signal must be determined by somewhat different considerations. In particular, the crystal rectifier, described in my prior applications and incorporated into the various arrangements of the present application to be described hereinafter, may operate in two different ways; and the value of the C.W. signal voltage necessary for operation of the crystal depends upon which of the ways the crystal rectifier is actually operating. If there is only one C.W. signal present (with any number of modulated channels) in a given area, there has to be a sufficient minimum voltage from the C.W. signal to create appreciable differences in the conductivity of the crystal for opposite directions of current. The lower limit for this voltage is in the order of one millivolt for most good crystals; and this type of crystal operation is in fact known to the prior art.

It will be appreciated from the previous discussion, however, that in an effort to increase the range of coverage effected by my novel UHF transmissions, there may be a plurality of continuous wave transmitters spaced from one another throughout the range to be covered; and as a result, there may be a plurality of continuous wave signals present at the antenna of a given VHF receiver. I have found, however, that when there are such a plurality of C.W. signals present, differing in frequency from one another by less than about one mc., the receiver will work perfectly well, with substantially no interference or beat between the C.W. signals so long as certain requirements are satisfied at the crystal. First, it is necessary that one of the C.W. signals have a peak voltage amplitude which is higher than the sum of all the peak voltages of the other C.W. and modulated signals present simultaneously at the crystal rectifier. Insofar as this first requirement is concerned, it will be appreciated that the receiver may, due to its very location with respect to the several C.W. transmitters, tend to receive a C.W. transmission from one such C.W. transmitter at an amplitude much higher than the other C.W. signals; and even when the receiver is in a location where it might possibly receive interfering C.W. signals, one such C.W. signal can be received at the necessary higher amplitude by making the receiver antenna directional in character.

In addition, in order that the rectifier work satisfactorily with substantially no interference, notwithstanding the presence of plural C.W. signals at the receiver antenna, it is important that the crystal operate substantially on a straight-line portion of its voltage-current characteristic curve. This latter requirement is satisfied by making the voltage of the largest C.W. signal more than a certain predetermined minimum amount, depending on the properties of the crystal; and this minimum value of voltage, with presently available crystals, is in the order of 0.1 volt peak.

In addition to the foregoing, a low D.C. biasing voltage may be added in series with the incoming signals to enable the crystal to respond to a smaller voltage from the C.W. transmitter. Such biasing voltage may vary from a few millivolts to 0.2 volt, depending upon the properties of the crystal; but the use of such a bias is optional and is only necessary with weak signals.

As will be appreciated from the entire foregoing discussion, a novel type of UHF transmission, effected in accordance with my prior applications, may comprise a modulated UHF transmitter (or a plurality of such modulated transmitters relatively widely spaced in the spectrum from one another so as to be non-interfering in nature) in conjunction with one or more UHF–C.W. transmitters spaced from one another physically and operative to provide a heterodyning frequency. A receiver adapted to respond to this type of transmission may comprise an antenna receiving both the modulated UHF signal and a UHF–C.W. signal; and this antenna may in turn be made directional in order to permit selection of one UHF–C.W. transmission and to effect reduction of other such transmissions which may be present in the area. The signals impressed upon the antenna are caused to ultimately produce a beat frequency signal within the tuning range of a conventional VHF receiver; and this beat frequency signal, obtained after appropriate rectification by a crystal rectifier of the type described, may be fed to the input of such a conventional VHF receiver.

A system of the type described may be employed in a given area for UHF television transmissions; and it will be appreciated that conventional VHF transmitters may also be located within such an area to effect conventional VHF transmissions. In order that both types of transmissions may be properly received and amplified by the same VHF receiver, certain special receiver arrangements (actually special antenna arrangements) should be provided; and the present invention is directly concerned with this problem, whereby both VHF transmissions of conventional type and UHF transmissions of the special types described above, are received by the same antenna arrangement and fed to the same conventional VHF receiver.

In addition to permitting both of these types of transmission to be received and interpreted by the same receiver, the present invention is further concerned with an arrangement adapted to permit such a conventional VHF receiver to utilize its channels of reception more efficiently than is possible at the present time. By way of example, it should be noted that, with presently known systems for VHF transmission and with presently known VHF receivers, the channels of reception are normally so allocated that there are unused channels spaced between the several used channels in a given area. This is necessitated by the poor adjacent channel rejection of conventionally known VHF receivers; and any attempt to use all the channels of a receiver for VHF transmission, under presently known arrangements, would result in considerable interference between signals present in certain adjacent channels.

The present invention, recognizing that there are in normal practice unused channels, permits previously unused channels to be employed for the reception of my novel UHF signals; and in particular, the unused channels would be filled with the beat frequency VHF signals resulting from the heterodyning of the received UHF modulated and UHF–C.W. signals described previously. By thus employing some of the channels for conventional VHF reception and other previously unused channels for reception of my special UHF transmission, a given conventional VHF receiver is adapted to utilize all of its channels (under present arrangements, twelve in number) for the reception of different signals.

In order to effect such full channel use, it is preferable that the antenna arrangement employed with the conventional VHF signal be adapted to reject unwanted VHF signals when a UHF transmission is to be coupled to the receiver, and vice versa; and the arrangements to be described hereinafter effect such a result. In particular, separate VHF and UHF antennas may be employed; and, when UHF is to be received, VHF signal interference is eliminated by disconnecting the transmission line of the VHF antenna and grounding both of the conductors of this line. The method used to eliminate interference caused by the beat carrier generated from two UHF signals contemplates connecting a high enough D.C. potential across the crystal in the blocking direction to make that crystal completely inoperative. This latter method is 100 percent effective and enables the use of several sets of UHF systems to operate in creating the same VHF beat signal, only one of which is permitted to function in the receiver at any one time (for example, if a 60 mc. channel is clear in a given location, it is possible to generate a 60 mc. beat signal between 5000 mc. and 5060 mc., as well as between 4000 mc. and 4060 mc., and several others).

It is accordingly an object of the present invention to provide an improved multiband receiver comprising a substantially conventional VHF television receiver in conjunction with improved and novel antenna arrangements.

Another object of the present invention resides in the provision of receiving systems adapted to receive either VHF or special types of UHF transmissions, without any change in the conventional receiver circuits.

A further object of the present invention resides in the provision of a television receiver arrangement adapted to utilize adjacent channels for picture reception.

A still further object of the present invention resides in the provision of a television receiver and antenna arrangement so constructed that a greater number of television channels may be employed for picture reception in a given area of reception than has been possible heretofore.

A still further object of the present invention resides in the provision of improved antenna arrangements for use with television receivers, enabling these receivers to utilize and select any one of several television programs on the same VHF channel.

In providing for the foregoing objects and advantages, the present invention contemplates the provision of antenna arrangements adapted to intercept either conventional VHF or special types of UHF signals, and adapted to couple such signals to a substantially conventional VHF receiver whereby said receiver may display a picture corresponding to the actual signal being interpreted. The arrangements are such that the antenna responds to the received signals in different manners depending upon whether the signal being interpreted is a VHF signal or a pair of UHF signals, one of which is modulated and the other of which is continuous wave; and the output of the antenna is a VHF signal within the tuning range of the VHF receiver regardless of which type of transmission is actually being received.

In accordance with certain embodiments of the present invention, a single antenna may be employed for receiving both types of signals; while in accordance with other embodiments of the present invention, separate antennas cooperating with a switching arrangement can be employed for the diverse types of reception. In either event, however, a single substantially conventional VHF receiver responds to both types of signals, with the receiver arrangement being such that a greater number of channels, including adjacent channels, can be employed for picture reception.

The foregoing objects, advantages, construction and operation of the present invention will become more readily apparent from the following description and accompanying drawings, in which:

FIGURE 1 illustrates a receiver arrangement constructed in accordance with one embodiment of the present invention and adapted to receive either conventional VHF signals or my special type of UHF signals.

FIGURE 2 comprises a modification of the circuit shown in FIGURE 1 and illustrates the method of blocking the operation of the crystal converter.

FIGURE 3 shows an antenna and receiver arrangement adapted to utilize adjacent channels, and if desired, all of the very high frequency channels, for picture reception in a VHF receiver; and FIGURE 4 shows a further arrangement, constructed in accordance with the present invention, for receiving any one of several programs on the same VHF channel.

Referring now to FIGURE 1, it will be seen that in accordance with the present invention, a conventional VHF TV receiver 10 may be provided for receiving and displaying pictures transmitted by either conventional VHF transmissions of the types presently known, or the special types of UHF transmissions described above. The receiver 10 includes, as is conventional, input terminals 11 associated with the usual input circuits in conventional VHF receivers; and the input terminals 11 may in turn be coupled by a transmission line 12 to an improved antenna arrangement adapted to receive either VHF signals or the special type of UHF transmissions described in my previous applications, as well as above. The antenna arrangement itself comprises an antenna 13 comprising a pair of arms **13*a* and 13*b* angularly disposed to one another, as illustrated, and designed to be capable of reception over a band of frequencies which include very high frequencies as well as ultra high and super high frequencies. The arms 13*a* and 13*b* of the antenna 13 include a pair of output terminals 14 feeding the aforementioned transmission line 12; and a crystal rectifier 15 is connected across the antenna output terminals 14**.

In the arrangement shown in FIGURE 1, the antenna 13 and crystal 15 respond to the diverse types of reception mentioned previously in diverse manners, depending upon the type of reception actually being interpreted by receiver 10. When the receiver 10 is switched to a channel corresponding to a conventional VHF frequency in the area, the antenna 13 operates as a half-wave dipole; and VHF signals intercepted by antenna 13 are coupled via transmission line 12 to the receiver input terminals 11 whereafter they are amplified, etc. in known manner. For this condition of one-carrier reception (i.e. reception of conventional VHF signals), the crystal rectifier 15 acts as a shunt load across the antenna terminals 14 and tends to reduce the available signal strength by a predetermined small but permissible amount; but the crystal rectifier 15 is otherwise ineffective. The VHF signals, even after this reduction in signal strength, are still of sufficient amplitude to permit normal operation of receiver 10 whereby said receiver is adapted to reproduce picture and sound from the input signal appearing at terminals 11, all in conventional manner.

When the receiver 10 is switched to a channel selected for reproduction of my special type of transmission comprising a modulated UHF and a UHF–C.W. signal, the antenna 13 operates as a multiple wavelength V antenna for received UHF and super high frequencies. The modulated ultra high or super high frequency signal, and the unmodulated signal at the ultra high or super high frequencies present on antenna 13, will be supplied via antenna output terminals 14 to the crystal rectifier 15; and for this condition of reception, the two UHF signals are heterodyned, whereafter a resultant signal, at the difference frequency of the two received signals, is transferred via transmission line 12 to the input 11 of receiver 10. The heterodyne or beat frequency signal thus transferred along transmission line 12 comprises, as has already been described, a VHF signal within the tuning range of receiver 10 whereby the said heterodyne frequency may be accepted and processed by the VHF receiver 10 in normal fashion.

It should be noted that for this condition of operation, the transmission line 12 tends to act as a condenser, helping to integrate the beats of the rectified UHF signals appearing at the input of line 12. It should further be noted that the receiver 10 actually responds to only the difference frequency between the received modulated and UHF–C.W. signals; and the UHF signals themselves, as well as their additive heterodyning frequencies, are severely attenuated by the input circuits of the television receiver whereby they have no effect upon the receiver operation.

The arrangement thus illustrated in FIGURE 1 permits the utilization, in an extremely simple manner, of the ultra high and super high frequency spectrum for television purposes, and overcomes many disadvantages inherent heretofore in the use of the UHF spectrum for picture reception. It also enables a conventional VHF receiver not only to receive the special type of UHF transmission, but also to receive and function normally on any conventional VHF signal so long as there is no beat signal on the same VHF frequency. This consideration is readily provided, of course, by allocating the conventional VHF signals in a given area to certain channels of the receiver and by so selecting the UHF modulated signals and their associated UHF–C.W. signals that the difference beat frequency produced by heterodyning of these UHF signals comprises a VHF signal different in frequency from other conventional VHF signals present in the area of reception. However, this type of receiving system requires the same spacing for the heterodyne frequency channel as conventional VHF channels, namely one unused channel on each side of the operating channel. It is, therefore, normally useful only in locations where three consecutive unused channels are obtainable. It should be noted, however, that in those locations where the UHF signals are much stronger than the VHF, it is possible to eliminate these stronger UHF signals when it is desired to receive VHF signals, by blocking the operation of the crystal rectifier 15 at the antenna. This blocking can be done by a few volts of D.C. potential applied to the crystal rectifier 15, as will be described hereinafter; and by employing this blocking method, all channels may be used, provided only that the VHF signals be much weaker than the UHF.

It will be appreciated, of course, that in some cases the unmodulated or continuous wave UHF carrier is relatively weak or non-existent due to the relative locations of the receiver and transmitters. In such a case, an arrangement such as that shown in FIGURE 1 may nevertheless receive both types of transmission through the addition of a small fixed frequency UHF oscillator such as 16 installed next to the VHF television receiver 10 and very loosely coupled to its antenna. Such a fixed frequency UHF oscillator acts to supplement the weak or non-existent UHF–C.W. signal, whereby the required beat frequency may be interpreted by receiver 10. It must be emphasized that the provision of an oscillator such as 16 is entirely optional; and the advantage of frequency stability, obtained from the much larger C.W. transmitter, is lost with the use of such an oscillator.

As was mentioned previously, the beat signal obtained from a mixing of UHF signals can be shut off by blocking the crystal in the antenna system with a low voltage D.C. potential. This is of great advantage when receiving a VHF signal and, as will be shown, under certain conditions it permits the use of several bands of UHF systems. This blocking method is shown in FIGURE 2. The arrangement of FIGURE 2 is, indeed, essentially similar to that already described in reference to FIGURE 1, whereby like numerals have been employed for like parts in these two figures.

In addition to the parts already described, however, the crystal rectifier 15 may be associated with a bias source 20, resistors 21, and a two-position switch 22. When switch 22 is in the lower of its two possible positions (for the reception of VHF), the source 20 is connected across the output terminals 14 of antenna 13 wherefore a small voltage from said battery 20 is impressed upon said crystal rectifier 15. This bias potential may be of either polarity, but the non-conducting direction is preferred. For this lower position of switch 22 the resistors 21 operate to isolate the battery 20 and its wiring from transmission line 12 thereby to prevent disturbance of the characteristic impedance of the receiving system; and resistors 21 further serve to limit the current drawn by battery 20 when such a battery is employed for bias purposes. The D.C. potential used may be in the order of three volts, and the current drawn is negligible.

For the reception of UHF, the switch 22 is moved to the upper of its two possible positions. The blocking potential of battery 20 is thereby removed from the circuit, and resistors 21 are connected directly across rectifier 15 to act as a load for said rectifier in a manner directly analogous to the crystal rectifier load shown in FIGURE 1. The system then operates to receive UHF signals in the manner already described.

It will be appreciated, of course, that while 20 has been described as a battery, it may be replaced by any other appropriate power source, including the power source normally present in receiver 10; and in this latter instance, B+ could be supplied through an appropriate network of resistors to the antenna output terminals 14 to effect the desired biasing of crystal rectifier 15. Moreover, the bias source 20 may be made adjustable to permit adjustment for best reception.

While the arrangements described above in reference to FIGURES 1 and 2 utilize a single antenna for reception of both conventional VHF and my special form of UHF transmission, it is preferable, in order that interference between adjacent channels of reception be fully eliminated, to utilize separate antennas adapted to respond to VHF and special UHF signals, respectively. When such a plural antenna arrangement is employed, a switching system can further be associated with the two antennas to permit one or the other of said antennas to be selected for a given type of reception; and the switching arrangement, indeed, is preferably such that, as one switches from one to another channel in the television receiver, the appropriate antenna for reception on that channel is automatically selected by the switching arrangement. Such a switching arrangement assures that, during the reception of ultra high or super high frequency signals, substantially no VHF signals are allowed to enter the input of the television receiver and vice versa; and this consideration permits all of the channels of a given television receiver (twelve in number at the present time) to be utilized in the same area of reception, notwithstanding the relatively poor selectivity normally considered to be present in such adjacent channel reception in known VHF receivers.

Indeed, in the arrangement to be described hereinafter in reference to FIGURE 3, the switching system can be such that a conventional VHF receiver could be designed to receive conventional VHF television signals on, say, every even-numbered channel, using a VHF antenna; and could be further designed to receive my special types of UHF signals on odd-numbered channels, through the use of a special type of UHF antenna.

Referring now particularly to FIGURE 3, it will be seen that, in accordance with this latter form of the present invention, a substantially conventional VHF receiver 30 may include a tuner 31 including a channel selector 32. The tuner 31 is provided, as is conventional, with input terminals 33; and these input terminals 33 are in turn coupled to an improved antenna and switching arrangement whereby conventional VHF signals or VHF beat frequency signals produced by heterodyning of UHF signals, are coupled to said tuner from one or the other of a pair of antennas. One of the pair of antennas mentioned has been designated 34, and this antenna is designed for reception of conventional VHF signals and is adapted to supply such VHF signals via transmission line 35 to a first pair of terminals 36, as well as to a second pair of terminals 37 comprising a portion of a switching arrangement to be described hereinafter. Thus, when VHF signals are received, such VHF signals appear on both of terminals 36 and 37 for processing, in a manner to be described hereinafter.

A second antenna 38 is provided for reception of UHF signals comprising a modulated and C.W. signal of the types described. The antenna 38 is relatively short in length, whereby any VHF signals present in the region of reception do not effect any appreciable output at the output terminals 39 of said antenna 38. Any signals intercepted by antenna 38 are coupled to a loop 40 comprising the input to a high-Q cavity resonator 41, and the output from said cavity resonator 41 is taken by means of an output loop 42. Cavity resonator 41 includes a tuning screw 43 which is adjustable to provide proper ratios of unmodulated to modulated signals within the cavity, or to eliminate interfering signals; and in this latter regard, it will be noted that by reason of the high-Q of the cavity resonator 41, any VHF signals which might perchance appear at the output terminals 39 of antenna 38 are further reduced in intensity in cavity 41. The actual structure of cavity 41 is discussed in some detail in my prior copending applications described previously, particularly in my prior copending application Serial No. 626,569, and reference is made to this prior description for a full discussion of the structure comprising resonator 41. The cavity resonator may be replaced by another form of resonator as for example a transmission line used conventionally in UHF receivers.

As will be appreciated from the foregoing discussion relating to cavity resonator 41, UHF signals appear on output loop 42, with conventional VHF signals present in the area being substantially eliminated through the combined action of antenna 38 and cavity resonator 41. Indeed, under normal practices, substantially all VHF signals present in an area can be eliminated from loop 42 by making antenna 38 directional in character and by orienting it properly with regard to the UHF transmitters. Output loop 42 which accordingly carries substantially UHF signals only, couples these signals to a crystal rectifier 44 which acts to heterodyne the unmodulated and modulated UHF signals to produce a difference frequency within the VHF passband of television receiver 30, and which further contains all of the modulations of the UHF or super high frequency modulated signal. This difference frequency is then coupled via transmission line 45 to a pair of terminals 46, as well as to a further pair of terminals 47 in the aforementioned switching arrangement.

Before proceeding with a description of the switching arrangement, it should be noted that while conventional VHF signals are substantially completely eliminated at loop 42 by reason of the various considerations already described, a transmission line such as 45 (comprising for example a conventional 300 ohm lead) might possibly act to intercept a VHF signal present in the area of reception. Any such VHF signals could, however, be eliminated on transmission line 45 by either shielding this lead-in, or by twisting the line 45 to effect cancellation of any VHF signals on the line. Attention to all of these factors will assure that substantially the only signals present at terminals 46 and 47 are VHF signals produced by heterodyning of UHF signals, in the manner described.

The switching arrangement illustrated in FIGURE 3 comprises a pair of double-pole double-throw switches 48 and 49 ganged to one another. Switch 48 is, as illustrated, associated with the pairs of terminals 37 and 47; and this switch has the arms thereof grounded through battery 50 so that one or the other of said pairs of terminals 37 and 47 will be coupled to ground, depending upon the position taken by switch 48. The potential of battery 50 does not affect the grounding of leads 35 but supplies blocking potential to crystal 44 when needed. The other switch portion 49 is associated with the pairs of terminals 36 and 46, with the switch arms being coupled to the input terminals 33 of tuner 31 whereby a conventional VHF signal, or a VHF beat frequency produced by heterodyning of UHF signals, will be coupled to said tuner 31 depending upon the position taken by switch 49.

Referring in particular to the arrangement shown, it will be noted that when the switches 48 and 49 are in their lefthand position, any conventional VHF signal intercepted by antenna 34 will be coupled to terminals 37, and will thence be passed to ground; while any VHF beat frequency signal produced by the components associated with antenna 38, will be coupled from terminals 46 through switch portion 49 to the input 33 of tuner 31. For this condition of operation, therefore, the television receiver 30 will receive and respond to a selected UHF transmission; and any VHF signals which might possibly tend to interfere will be substantially eliminated through the grounding arrangement associated with antenna 34, as well as through the various elimination considerations mentioned in conjunction with the components associated with antenna 38. In the event that the switches 48—49 are moved to their righthand postion, crystal 44 will be blocked by battery 50 and no VHF beat frequency will appear on line 45, while conventional VHF transmissions received by antenna 34 will be coupled through switch portion 49 to the input terminals 33 of tuner 31.

Accordingly, by switching between the antennas 34 and 38, one can be assured that a desired signal is received without interference from other signals in the area; and, as is particularly illustrated in FIGURE 3, the switch portions 48—49, in addition to being ganged to one another, can be further coupled to channel selector 32 so that selection of a given channel of reception automatically positions the switches 48—49 for the proper mode of reception.

It will be noted that, in the arrangement shown in FIGURE 3, the switching between antennas is actually accomplished in the television receiver 30, whereby double lead-ins from the two antennas 34 and 38 respectively are required. If desired, the switching may be made at the antenna itself by a suitable relay, thereby eliminating such double lead-ins. In addition, it should be noted that, while no specific form of channel allocation is necessary for the reception of both types of transmissions, it may as a practical matter be preferable to so arrange the switching arrangement that alternate channels tune to VHF and UHF in sequence, thereby making tuning easier for the layman.

In the foregoing description only one set of UHF signals were considered and the generated beat signals were distributed in the VHF spectrum among the VHF signals broadcast in a given area. With the methods described, however, it is possible to have two sets of UHF signals operate wtih two sets of antennas each of which may be similar to the one shown at 38 on FIGURE 3. One of the antenna systems may operate with a 5000 mc. unmodulated carrier and beat with UHF modulated carriers to generate the even numbered channels on a VHF receiver, while the other antenna system may operate with a 4000 mc. unmodulated carrier and generates the uneven numbered channels in the VHF receiver. Inasmuch as complete blocking of the unused converter crystal is possible, no interference will occur and all the channels in the VHF receiver may be used.

In a similar manner several sets of UHF bands may be used and a VHF receiver with twelve channels may be made to receive twenty-four, thirty-six, or even greater numbers of programs. This is of advantage in educational television where a large number of classes may be taught simultaneously. This particular feature is, indeed, of considerable importance since, by using the present invention, the number of receivable programs is greatly increased without requiring any change in the receiver itself. Such an arrangement is shown in FIGURE 4.

Referring now to FIGURE 4, it will be seen that an antenna arrangement adapted for use with a conventional VHF receiver so as to permit that receiver to utilize and select any one of several television programs on the same VHF channel, may comprise a plurality of UHF antennas 61, 62 and 63, each of which can be generally similar to the antenna 38 described in reference to FIGURE 3. FIGURE 4 actually illustrates only UHF antennas, and is particularly directed toward the concept of receiving a large plurality of UHF signals, generally of the types already described, on a conventional VHF receiver. It will be appreciated, however, that the arrangement to be described hereinafter in reference to FIGURE 4 may also include a VHF antenna similar to antenna 34 (FIGURE 3) as well as a switching arrangement for switching between the UHF and VHF antenna portions of the system to permit multiband operation, as well as the reception of plural programs on any given channel of the receiver.

Insofar as UHF reception is concerned, it will be noted that each of the several antennas 61, 62 and 63 is coupled to a converter designated 60; and in order to illustrate the correspondence between FIGURES 3 and 4, the portion of the circuit included in the three blocks 60 of FIGURE 4 has been designated by broken line in FIGURE 3. Each of the converters 60 shown in FIGURE 4 includes a resonator and a crystal rectifier adapted to convert received UHF signals to a VHF signal within the passband of the VHF receiver 64. It is contemplated that a plurality of different frequency UHF signals, carrying different programs respectively, will be transmitted simultaneously within a given area. The resonators in the three blocks 60 shown in FIGURE 4 are tuned to these different UHF frequencies respectively. Accordingly, the converter associated with antenna 61 will produce a VHF output in response to UHF signals of a first frequency, while the block 60 associated with antenna 62 will produce a VHF signal in response to UHF signals of a second different frequency, etc.

The different frequency UHF–C.W. and modulated UHF signals received by antennas 61—63, are so selected that they differ from one another by the same VHF beat frequency. Accordingly, each of the blocks 60 is adapted to produce a VHF signal of the same predetermined beat frequency, but in response to reception of UHF signals of different frequencies respectively. It will be appreciated, therefore, that the outputs of each of the three converters 60 shown in FIGURE 4 can be used on the same VHF channel of the receiver 64; and accordingly, one may receive (in the particular arrangement of FIGURE 4) three different UHF transmissions on the same VHF channel of receiver 64 by the simple expedient of coupling the output from any selected one of the converters 60 to the receiver 64 while the outputs from the other two converters 60 are blocked.

The foregoing blocking functions are accomplished by a switching and biasing network coupled to the lower ends of the several transmission lines **45*a*, 45*b* and 45*c*, which lines are individually the same as the transmission line 45 already described in reference to FIGURE 3. The blocking potential is derived from the B+ supply 65; and three separate switches 66, 67 and 68 are provided for determining whether or not blocking potential is coupled to any particular rectifier (analogous to 44) in a particular converter 60. In the arrangement particularly illustrated in FIGURES 4, the switch 67 is closed while both of switches 66 and 68 are open. For this particular arrangement, therefore, the potential from the B+ supply 65 is coupled via appropriate dropping resistors to the crystal rectifiers in the converters 60 associated with antennas 61 and 63, respectively; and the application of this blocking potential prevents any VHF beat frequency signals from appearing on the transmission lines 45*a* and 45*c*. Inasmuch as switch 67 is closed, however, the B+ supply 65 is not coupled to the crystal rectifier in the converter associated with antenna 62; and instead the two resistors 69 and 70 are connected directly across the rectifier in the converter associated with antenna 62 wherefore resistors 69 and 70** operate as a load on that rectifier. In this respect, therefore, it will be noted that the switching arrangement shown in FIGURE 4 operates in a manner directly analogous to that already described in reference to FIGURE 2, i.e. in one position of each switch a blocking potential is applied via dropping resistors to the rectifier, while in another position of the switch the blocking source is isolated from the rectifier and the dropping resistors are connected across the rectifier to act as a load therefor.

The three switches 66, 67 and 68 are preferably ganged to one another so that any one of the switches may be closed while the other two switches are simultaneously opened. As the switches 66, 67 and 68 are changed in position, the VHF beat frequency signal coupled to receiver 64 will be derived from selected different ones of the transmission lines **45*a*, 45*b* and 45*c*; and inasmuch as the same VHF beat frequency signal appears on each of these transmission lines, the same VHF channel of receiver 64 may be utilized to display the picture. However, inasmuch as this VHF beat frequency signal is derived in the three different converters 60** from three different frequency sets of UHF signals, we have in effect an arrangement whereby three separate programs can be displayed at will on the same VHF channel of a conventional VHF receiver.

Still further modifications will be suggested to those skilled in the art. It must therefore be emphasized that the foregoing discussion is meant to be illustrative only and should not be considered limitative of my invention; and all such modifications and variations as are in accord with the principles described are meant to fall within the scope of the appended claims.

Having thus described my invention, I claim:

1. A television receiving system adapted to receive very high frequency television signals as well as other television signals broadcast as a modulated ultra high or super high frequency signal and at least one continuous wave ultra high or super high frequency signal, said continuous wave signal differing from said modulated signal by a very high frequency, said ultra high or super high frequency continuous wave signals providing, at a receiving point within the effective area covered by said signals, a substantially higher power of continuous wave signal than of said modulated signal; said receiving system comprising a very high frequency receiver including antenna means havng a crystal rectifier coupled thereto at the antenna site and coupled to said receiver through a very high frequency transmission line, heterodyning means including said crystal rectifier for heterodyning said modulated and said continuous wave signal at said antenna site to create a very high frequency modulated signal having a frequency within the tuning range of said receiver, and means for selectively applying a blocking potential to said crystal rectifier, for disabling said crystal rectifier thereby to prevent said heterodyning of said ultra high or super high frequencies whereby said receiver is adapted to receive and interpret very high frequency television signals intercepted by said same antenna means in a given area of reception.

2. A multiband television receiver comprising a pair of antennas adapted respectively for the reception of VHF and UHF signals, a VHF receiver, means including a rectifier coupled to said UHF antenna for converting UHF signals received by said antenna to a VHF signal within the tuning range of said receiver, VHF transmission means coupling the output of said VHF antenna as well as the output of said converting means to the input of said VHF receiver, and switching means for selectively changing which of said antennas is coupled to the input of said receiver via said VHF transmission means during channel tuning of said receiver, said switching means being operative to couple one of said antennas to said receiver input for given channels of reception and being operative to couple the other of said antennas to said receiver input for channels of reception adjacent to said given channels, whereby different adjacent channels of said receiver are adapted for UHF and VHF reception respectively, said switching means including means for reversely biasing said rectifier, to prevent converting of said UHF signals, when said VHF antenna is coupled to the input of said receiver.

3. The combination of claim 2 wherein said switching means also includes means for grounding the output of the nonselected one of said antennas.

4. A multiband television receiver adapted to receive both VHF television signal transmissions and UHF television signal transmissions, said receiver comprising a VHF receiver including antenna means coupled to the input of said receiver, converting means coupled to said antenna means for changing said UHF signals, when they are received, to a very high frequency beat signal within the tuning range of said VHF receiver but different in frequency from said VHF signals, and channel tuner means in said receiver for responding to said received VHF signals on first predetermined spaced channels of reception and for responding to said very high frequency beat signals on other channels of reception located in frequency between said predetermined spaced channels of reception whereby adjacent channels of said receiver reproduce different ones of said transmissions respectively, said channel tuner means including means for disabling said converting means when said receiver is tuned to one of said first spaced channels of reception.

5. A multiband television receiver comprising a VHF receiver, antenna means adapted to receive VHF and UHF signals, converter means coupled to said antenna means at a position closely adjacent said antenna means and remote from said receiver and responsive to said UHF signals for converting said UHF signals to very high frequency beat signals different in frequency from any of said VHF signals, VHF transmission means connecting said antenna means to the input of said VHF receiver for coupling either said beat signals or said VHF signals to said receiver input, said receiver including tuner means providing at least one channel of reception for said received VHF signal and providing a directly adjacent channel of reception for said converted UHF signal, whereby adjacent channels of said receiver are utilized for different types of signals respectively, and means for disabling said converter means when said receiver is tuned to said one channel of reception.

6. A multiband television receiver comprising a VHF receiver, a transmission line, antenna means coupled to the input of said receiver via said transmission line and adapted to receive transmitted VHF and UHF signals for utilization by said receiver on predetermined different channels of reception respectively, means coupled to said antenna means including a crystal rectifier located adjacent said antenna means and remote from said receiver for converting received UHF signals to a very high frequency signal within the pass band of said VHF receiver when transmitted UHF signals are to be received by said antenna means for utilization on first predetermined channels of said receiver, and control means located at said receiver for applying a direct current blocking potential via said transmission line to said rectifier rendering said converting means inoperative when transmitted VHF signals are to be received by said antenna means for utilization on second predetermined channels of said receiver adjacent to said first predetermined channels.

7. In combination, a VHF television receiver, antenna means coupled to the input of said receiver comprising a plurality of UHF antennas respectively adapted to receive UHF television signals at different frequencies, means including a crystal rectifier coupled to each of said UHF antennas for converting said different frequency UHF television signals, received by said plurality of antennas, to a VHF signal output within the passband of said VHF receiver, said VHF signal having the same frequency at the output of each of said converting means whereby the outputs of all said converting means may be utilized by the same channel of said VHF receiver, a source of blocking potential, and switching means for coupling said source to all but a selected one of said crystal rectifiers for rendering all but one of said converting means inoperative whereby the VHF signal passed at said same frequency to said VHF television receiver is derived from a preselected one of said received different frequency UHF signals thereby to permit any selected one of plural television pictures to be received on the same channel of said receiver.

8. In combination, a VHF television receiver, a plurality of UHF antennas, a plurality of converter means coupled respectively to said plurality of antennas for individually converting UHF television signals received by different ones of said antennas to a predetermined common VHF frequency corresponding to the frequency of a single VHF channel in said receiver, said plurality of converters including means resonant to different UHF frequencies respectively whereby said common VHF frequency at the outputs of said plurality of converters is derived from a plurality of different frequency UHF television transmissions respectively, means coupling the outputs of said converters to the input of said receiver, and means for blocking the coupling of said VHF frequency to said receiver from all but a selected one of said converting means whereby any selected one of a plurality of different frequency UHF television transmissions may be utilized on the same VHF channel of said receiver.

9. In combination, a VHF receiver, UHF antenna means adapted to receive a plurality of different frequency UHF transmissions, a plurality of converter means coupled to said antenna means at the location of said antenna means and remote from said receiver, each of said converter means being adapted respectively to convert a selected one of said different frequency UHF transmissions to a predetermined VHF frequency corresponding to the frequency of a single VHF channel in said receiver, said plurality of converters including means resonant to different UHF frequencies respectively whereby said predetermined VHF frequency at the outputs of said plurality of converters is derived from a plurality of different frequency UHF transmissions respectively, VHF transmission means coupling the outputs of said converters to the input of said receiver, and switching means for disabling all but a selected one of said converter means whereby any selected one of a plurality of different frequency UHF transmissions may be utilized on the same VHF channel of said receiver.

10. A receiving system adapted to receive a modulated ultra high or super high frequency signal for heterodyning with a continuous wave ultra high or super high frequency signal, comprising a very high frequency receiver, heterodyning means including a crystal rectifier for heterodyning said modulated and said continuous wave signals at said receiver to create a very high frequency modulated signal having a frequency within the tuning range of said receiver when it is desired to interpret said modulated signal, and means for selectively applying a blocking potential to said crystal rectifier for substantially disabling said crystal rectifier thereby to prevent said heterodyning when it is not desired to interpret said modulated signal, whereby said crystal rectifier performs a dual function of heterodyning and signal switching in dependence upon the presence or absence of said blocking potential.

11. A television receiver adapted to receive two modulated television signals for display on two directly adjacent receiver channels respectively, one of said television signals having a frequency corresponding to one of said channels of reception, and the other of said television signals having a frequency higher than that corresponding to the other channel of reception, comprising antenna means coupled to said receiver and adapted to intercept both said television signals, converter means for selectivelv converting said other one of said two television signals to a lower frequency signal corresponding to the frequency of said other channel of reception, transmission means coupling said antenna means to the input of said receiver for coupling either said one television signal or said converted other one of said television signals to said receiver input, and control means operative to disable said converter when said one of said television signals is to be displayed on said one channel of reception.

References Cited in the file of this patent

UNITED STATES PATENTS

| | | |
|---|---|---|
| 1,457,447 | Mills | June 5, 1923 |
| 1,699,567 | Ohl | Jan. 22, 1929 |
| 1,813,923 | Heising | July 14, 1931 |
| 2,144,386 | Dietrich | Jan. 24, 1939 |
| 2,425,352 | Sloss | Aug. 12, 1947 |
| 2,476,885 | McClellan | July 10, 1949 |
| 2,640,919 | Bell et al. | June 2, 1953 |
| 2,688,699 | Hiehle | Sept. 7, 1954 |
| 2,760,061 | Pan et al. | Aug. 21, 1956 |
| 2,836,711 | Krepps | May 27, 1958 |
| 2,902,598 | Hills | Sept. 1, 1959 |

FOREIGN PATENTS

| | | |
|---|---|---|
| 596,053 | Germany | Apr. 26, 1934 |